FOWLER & WALTER.
Churn.

No. 32,939.

Patented July 30, 1861.

Witnesses

Inventors

UNITED STATES PATENT OFFICE.

JOHN FOWLER AND W. L. WALTER, OF HOMER, NEW YORK.

CHURN.

Specification of Letters Patent No. 32,939, dated July 30, 1861.

*To all whom it may concern:*

Be it known that we, JOHN FOWLER and W. L. WALTER, both of Homer, in the county of Cortlandt and State of New York, have invented a new and Improved Churn; and we do hereby declare that the following is a full, clear, and exact description of the same, reference being had to the annexed drawings, making a part of the same, in which—

Figure 2:
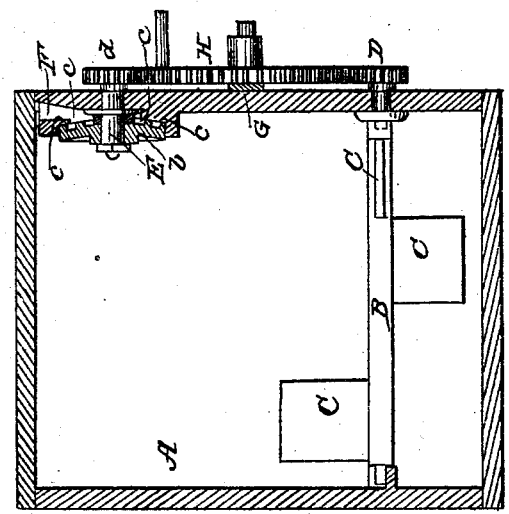
Figure 1:
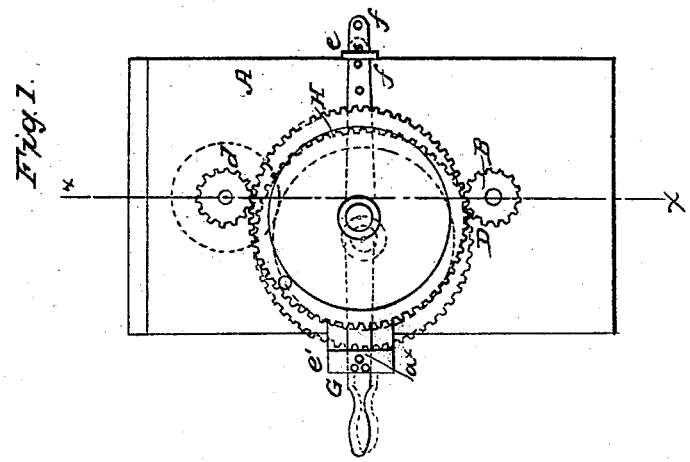

Figure 1 is a side view of our invention. Fig. 2 is a section of the same taken in the line $x, x$, Fig. 1.

Similar letters of reference indicate corresponding parts in the two figures.

This invention relates to an improvement in that class of churns in which grinding or beating attachments are used for rupturing the globules which contain the butter.

To enable those skilled in the art to fully understand and construct our invention, we will proceed to describe it.

A represents the body of the churn, which may be of rectangular or other proper form; and B is a shaft which is placed horizontally in the lower part of the body A, and allowed to rotate freely therein. The shaft B, has radial beaters or wings C, attached to it, and one end of said shaft extends through the side of the body A, and has a pinion D, on it.

In the upper part of the body A, at one side of it there are grinding or beating plates or disks $a, b$. The plate $a$, is stationary and may be provided on its face with any suitable projections or ribs, or have a smooth surface, as may be desired. The plate or disk $b$, is a rotating one, and is provided with projections or ledges $c$, of annular or other proper form. The plate or disk $b$, is on a shaft E, which extends through the center of the stationary disk $a$, and through the side of the body A, and has a pinion $d$, on it.

F is a hopper by which the milk or cream is conducted down between the disks $a, b$,—see Fig. 2.

G is a metal bar which is fitted horizontally in guides $e, e'$, at the side of the body A. This bar G, has the axis of a toothed wheel H, attached to it. The bar G, is allowed to slide a certain distance in its sliding movement. The guide $e'$, is rather wider than the other $e$, and this wide guide admits of the bar G, being raised and lowered at one end, to throw the wheel H, in gear with either of the pinions D, $d$, while the longitudinal sliding movements admits of the wheel H, being thrown in gear with both pinions simultaneously if desired. A pin $a^*$, passing through any of a series of holes in the guide $e'$, and bar G, retains the latter in any desired position.

The disks $a, b$, in consequence of being in the upper part of the body A, of the churn, are not brought in contact with the cream or milk below, the cream or milk being poured directly into the hopper F, and passing down between the disks $a, b$, to the lower part of the churn entirely out of the way of the disks. The operation therefore of the disks will not be at all interfered with by the cream or milk after it has passed between them, as is the case where the disks are in the lower part of the body A, and concentric with shaft B. The disks $a, b$, serve as beaters or grinders and rupture the small globules or sacs which contain the butter, while the wings C, by their rotation, gather the same into masses.

By having the wheel H, attached to the bar G, and the latter arranged as shown, the disk $b$, may be rotated without the shaft B, or the latter may be rotated without the former or both rotated simultaneously as may be desired. This is an important feature of the invention for it is frequently necessary to use the disks without the wings or gatherers and vice versa.

We do not claim the disks $a, b$, for they have been used, as well as the rotating wings C. But

Having thus described our invention, what we claim as new, and desire to secure by Letters Patent, is:—

The arrangement of the sliding or adjustable bar G, with the wheel H, attached and arranged in relation with the pinions D, $d$, of the shaft B, and disk $b$, to operate as and for the purpose set forth.

JOHN FOWLER.
W. L. WALTER.

Witnesses:
A. CLARK,
I. KELSEY.